United States Patent
Osada et al.

[11] Patent Number: 5,735,463
[45] Date of Patent: Apr. 7, 1998

[54] JETAVATOR FOR ROCKET ENGINE

[75] Inventors: Akira Osada, Urawa; Takefumi Shiraishi, Tokyo; Hiroshi Fujiyoshi, Kawasaki, all of Japan

[73] Assignee: Nissan Motor Co., Ltd., Kanagawa, Japan

[21] Appl. No.: 620,691

[22] Filed: Mar. 21, 1996

[30] Foreign Application Priority Data

Mar. 31, 1995 [JP] Japan ..................... 7-076590

[51] Int. Cl.⁶ .................................................. B64C 15/06
[52] U.S. Cl. .................... 239/265.19; 239/397.5
[58] Field of Search ............. 239/397.5, 265.19; 60/266, 232, 228

[56] References Cited

U.S. PATENT DOCUMENTS

| | | | |
|---|---|---|---|
| 2,900,789 | 8/1959 | Philpot | 239/397.5 X |
| 3,182,452 | 5/1965 | Eldred | 60/232 |
| 3,224,193 | 12/1965 | Loprete et al. | 239/397.5 X |
| 3,291,397 | 12/1966 | Johnson | 239/397.5 X |
| 3,972,475 | 8/1976 | Nelson et al. | 239/387.5 X |
| 4,649,701 | 3/1987 | Wendel . | |
| 5,392,596 | 2/1995 | Holsapple et al. . | |

FOREIGN PATENT DOCUMENTS

| | | | |
|---|---|---|---|
| 1112030 | 3/1956 | France . | |
| 1112699 | 3/1956 | France . | |
| 05280424 | 3/1992 | Japan . | |
| 807011 | 1/1959 | United Kingdom | 239/397.5 |
| 916692 | 1/1963 | United Kingdom . | |
| 960106 | 6/1964 | United Kingdom . | |
| 1189052 | 4/1970 | United Kingdom . | |
| 1248573 | 10/1971 | United Kingdom . | |
| 1291586 | 10/1972 | United Kingdom . | |
| 1334592 | 10/1973 | United Kingdom . | |
| 1342342 | 1/1974 | United Kingdom . | |

OTHER PUBLICATIONS

"Second Edition—Aerospace Engineering Handbook" by Maruzen Co., Ltd. pp. 934–935, published Sep. 30, 1992.

*Primary Examiner*—Kevin Weldon
*Attorney, Agent, or Firm*—Lowe, Price, LeBlanc & Becker

[57] ABSTRACT

A jetavator rotatably installed to a nozzle exit of a rocket engine in order to control the thrust direction of the engine. The jetavator is generally in a hollow frustoconical shape and comprises a heat-resistant layer, a heat insulating layer and a reinforcing layer which are laminated one upon another. The heat-resistant layer is formed with a plurality of slits through which it is divided into a plurality of parts. Each slit is formed passing from the inner peripheral surface to the outer peripheral surface of the heat-resistant layer. Each slit is closed with a backplate which extends along the slit.

8 Claims, 5 Drawing Sheets

5,735,463

JETAVATOR FOR ROCKET ENGINE

BACKGROUND OF THE INVENTION

1. Field of the Invention

This invention relates to improvements in a jetavator to be used for controlling thrust direction of a rocket engine, and more particularly to a measure to prevent the heat-resistant layer of the jetavator from cracking even under a high thermal stress.

2. Description of the Prior Art

A jetavator is formed having an annular cross-section and rotatably installed to the outer periphery of a nozzle exit of a rocket engine. The jetavator is operatively connected to an actuator disposed at the side of the nozzle. The jetavator is arranged to be rotated under operation of the actuator, thereby deflecting the jet of combustion gas from the combustion chamber of the rocket engine. As a result, the thrust direction of the rocket engine can be controlled. Such a jetavator is disclosed, for example, in "Second Edition—Aerospace Engineering Handbook", pages 934 and 935, published on Sep. 30, 1992 by Maruzen Co., Ltd. in Japan.

In rocket engines, aluminum powder is added as an auxiliary fuel to a propellant to realize a high performance propulsion system. However, this unavoidably causes combustion gas temperature to excessively rise and increases heat transmission to the nozzle and members near the nozzle. Accordingly, in case of using a thrust direction control system including the jetavator, the jetavator is subjected to abrupt thermal input at the initial period of combustion in the combustion chamber of the rocket engine, and to local thermal input or the like during a rotational movement of the jetavator. As a result, a very high thermal stress is generated in the jetavator, such phenomena becomes conspicuous as the performance of the propulsion system becomes higher, and may produce crack in the jetavator. Therefore, the jetavator under such a condition has been required to be improved against the thermal stress or shock.

SUMMARY OF THE INVENTION

It is an object of the present invention to provide an improved jetavator for a rocket engine, which can effectively overcome the drawbacks encountered in conventional jetavators for use in rocket engines.

Another object of the present invention is to provide an improved jetavator for a rocket engine, which has such a construction as to effectively prevent the jetavator from being cracked even under a high thermal stress applied to the jetavator.

A further object of the present invention is to provide an improved jetavator for a rocket engine, which includes a heat-insulating layer which is constructed to effectively dissipate thermal stress applied thereto to prevent the heat-insulating layer from being cracked.

A jetavator of the present invention is for a rocket engine and comprises a heat-resistant layer having an annular cross-section, directly contactable with combustion gas. A slit is formed in the heat-resistant layer in a manner to pass from the inner peripheral surface to the outer peripheral surface of the heat-resistant layer.

With the jetavator of the present invention, the thermal stress to be applied to the heat-resistant layer can be effectively dissipated by virtue of the slit. This can prevent the heat-resistant layer from producing crack which is difficult to be specified in location and shape, effectively maintaining the function of deflection of combustion gas jet while readily coping with thermal problems in a high performance propulsion system using a propellant to which an auxiliary fuel is added. Additionally, lowering the level of thermal stress to be applied to the heat-resistant layer makes it possible to reduce the thickness of the heat-resistant layer thus contributing to weight-lightening of whole the jetavator.

BRIEF DESCRIPTION OF THE DRAWINGS

In the drawings, like reference numerals and characters designate like elements and parts throughout all figures, in which.

DETAILED DESCRIPTION OF THE INVENTION

Figure 9:
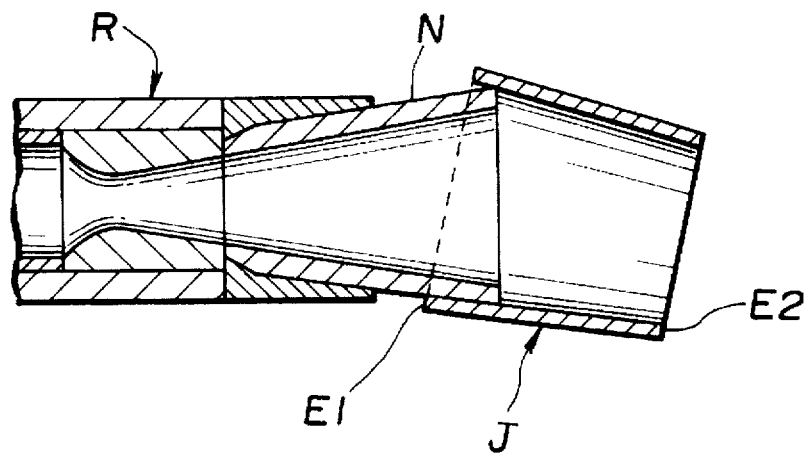
FIG. 9 is a fragmentary sectional view of a rocket engine provided with the jetavator according to the present invention.

Referring now to FIGS. 1A, 1B, 2 and 3 of the drawings, a first embodiment of a jetavator according to the present invention is illustrated by the reference character J. As shown in FIG. 9, the jetavator J is installed to the exit of a nozzle N of a rocket engine R in such a manner as to cover the outer periphery of the nozzle exit to be rotatable. The jetavator J is connected to an actuator (not shown) disposed at the side of the nozzle N so as to be rotatably operated by the actuator thereby to deflect combustion gas jet from the nozzle N thus controlling the thrust direction of the rocket engine R.

The jetavator J is formed generally frustoconical and hollow to have an annular cross-section on a plane (not shown) perpendicular to the center axis X of the jetavator J. Accordingly, the jetavator J has a first end E1 which has a diameter larger than that of a second end E2, in which the outer peripheral surface is papered. The side of the first end E1 is installed to the nozzle N. The hollow H of the jetavator J is formed extending from the first end E1 to the second end E2 and opened to the both ends E1, E2. The jetavator J includes a heat-resistant layer or section 11, a heat insulating layer or section 12 and a reinforcing layer or section 13 which are formed laminated. The heat-resistant layer 11 is located inner-most, whereas the reinforcing layer 13 is located outer-most, so that the heat insulating layer 12 is located between the heat-resistant layer 11 and the reinforcing layer 13.

The heat-resistant layer 11 is formed of a material such as tungsten, molybdenum and/or ceramic. The heat-resistant layer 11 is divided into two counterparts 11a, 11a in a circumferential direction of the layer 11, forming two slits S, S therebetween. Each slit S extends from the first end E1 to the second end E2 and passes from the inner peripheral surface to the outer peripheral surface of the heat-resistant layer 11. The slits S, S are located at opposite sides of the center axis X of the jetavator J and directed such that a plane containing the jetavator center axis passes through the slits S, S. The heat-resistant layer 11 is first produced as a one-piece structure, for example, by sintering, and then divided into the two counterparts 11a, 11a, for example, by electrical discharge machining after being ground.

Thus, each counterpart 11a has opposite side edge portions P, P (shown in FIG. 2) each of which has an edge (no numeral) at its tip end. Each side edge portion P extends along the edge from the first end E1 to the second end E2. The facing edges of the adjacent side edge portions P, P of the counterparts 11a, 11a forms therebetween the slit S. Each side edge portion P is formed with a cutout or groove 11b, 11b which is opened to the surface of edge of the side edge portion P and to the outer peripheral surface of the counterpart 11a. Each cutout extends along the edge of the side edge portion P from the first end E1 to the second end E2. The adjacent cutouts 11b, 11b of the counterparts 11a, 11a face to each other to form a gutter-like groove (no numeral) into which the slit S merges. A backplate 14 with a filler (not shown) is disposed within the gutter-like groove, thereby closing the slit S. The backplate 14 is formed of a material such as tungsten, molybdenum and/or ceramic, like the heat-resistant layer 11.

The heat insulating layer 12 is mounted on the heat-resistant layer 11 so that the inner peripheral surface thereof is in contact with the outer peripheral surface of the heat-resistant layer 11. The heat insulating layer 12 is formed of a material such as fiber-reinforced plastic, rubber or ceramic. The heat insulating layer 12 is bonded to the outer peripheral surface of the heat-resistant layer 11 with an adhesive of a ceramic system (containing ceramic as a main component), after being fabricated and turned to form a laminated structure.

The reinforcing layer 13 is formed of a material such as steel or aluminum, and fabricated by turning. The reinforcing layer 13 is bonded to the outer peripheral surface of the heat insulating layer 12 with an adhesive of an epoxy system (containing an epoxy resin as a main component), thus fabricating the jetavator J.

In operation, the above jetavator J in use with the rocket engine R as shown in FIG. 9 is subjected to an abrupt thermal input at the initial period of combustion in the combustion chamber of the rocket engine R, and to a local thermal input or the like during a rotational movement of the jetavator J. As a result, a very high thermal stress is generated at the heat-resistant layer 11. However, such a thermal stress applied to the heat-resistant layer 11 is dissipated under the action of the slits S, so that no crack can be formed in the heat-resistant layer 11. Additionally, the backplate 14 effectively prevents high pressure combustion gas from leaking through the slits S. It will be understood that the structural strength of the jetavator J can be maintained at a high level under the action of the reinforcing layer 13, while the heat-insulating characteristics of the jetavator J can be effectively maintained at a high level under the action of the heat insulating layer 12.

Figure 1A:
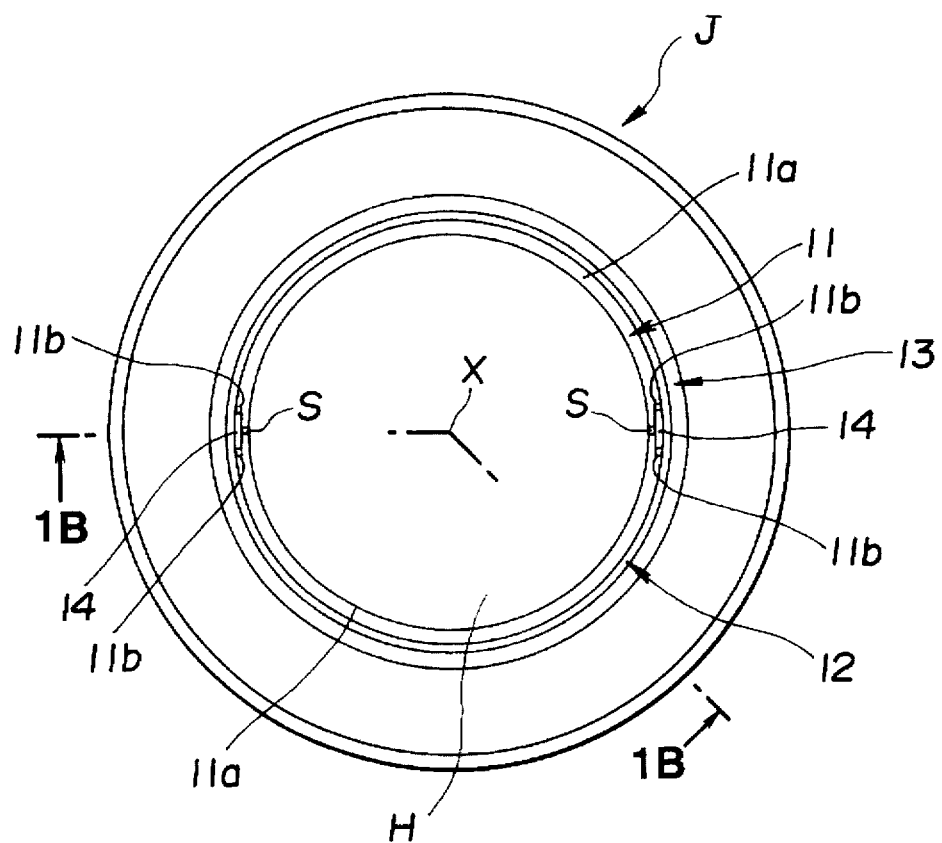
FIG. 1A is a side view of an first embodiment of a jetavator according to the present invention, as viewed from one direction.
Figure 1B:
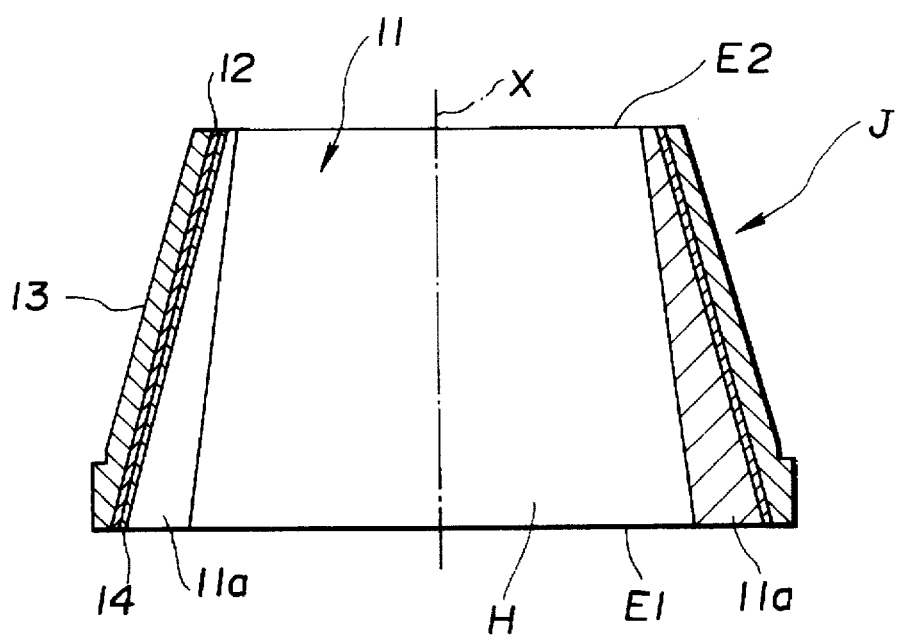
FIG. 1B is a cross-sectional view taken in the direction of arrows substantially along the line 1B—1B of FIG. 1A.
Figure 2:
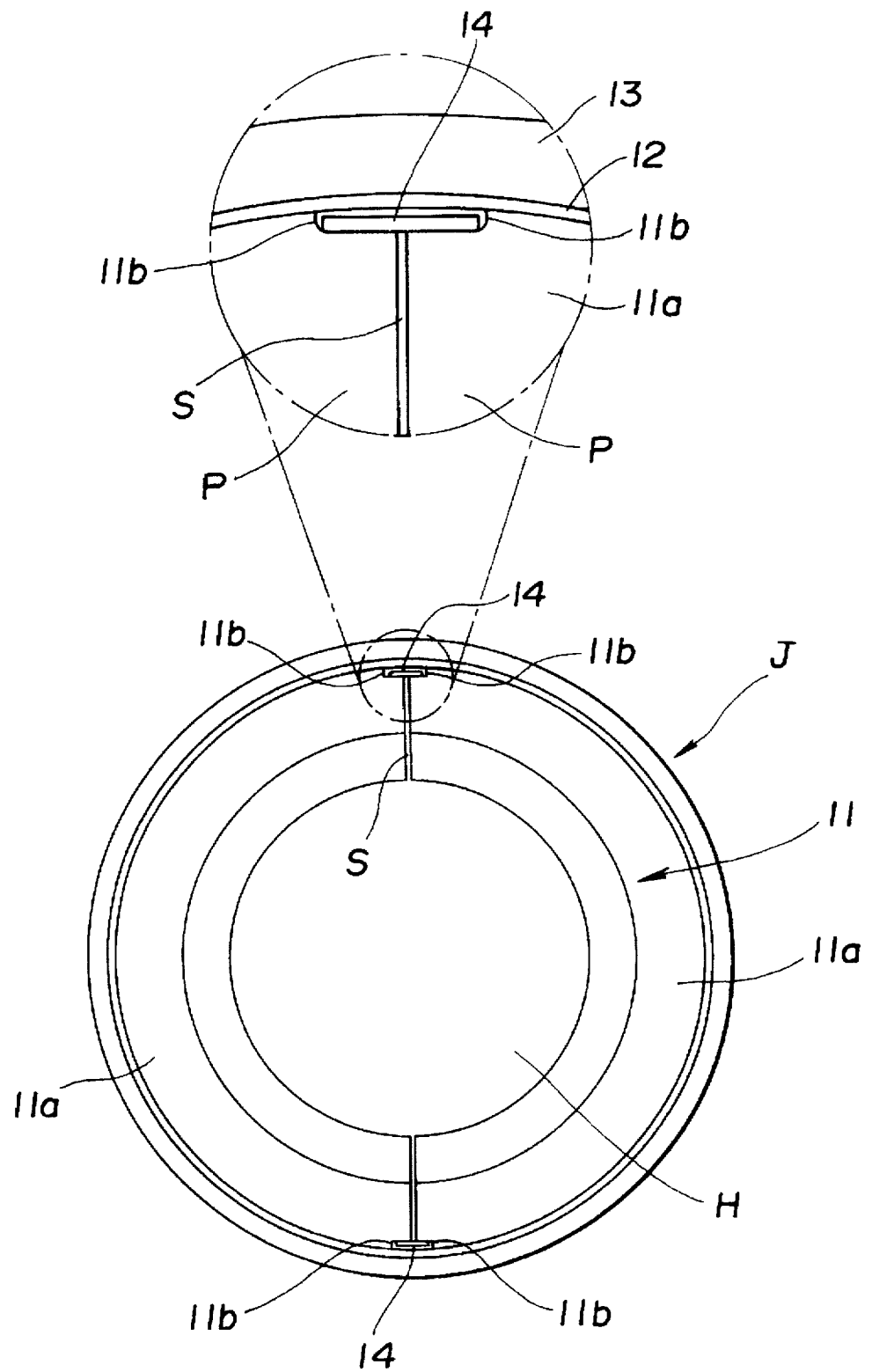
FIG. 2 is another side view of the jetavator of FIG. 1A, as viewed from the opposite direction to that in FIG. 1A.
Figure 3:
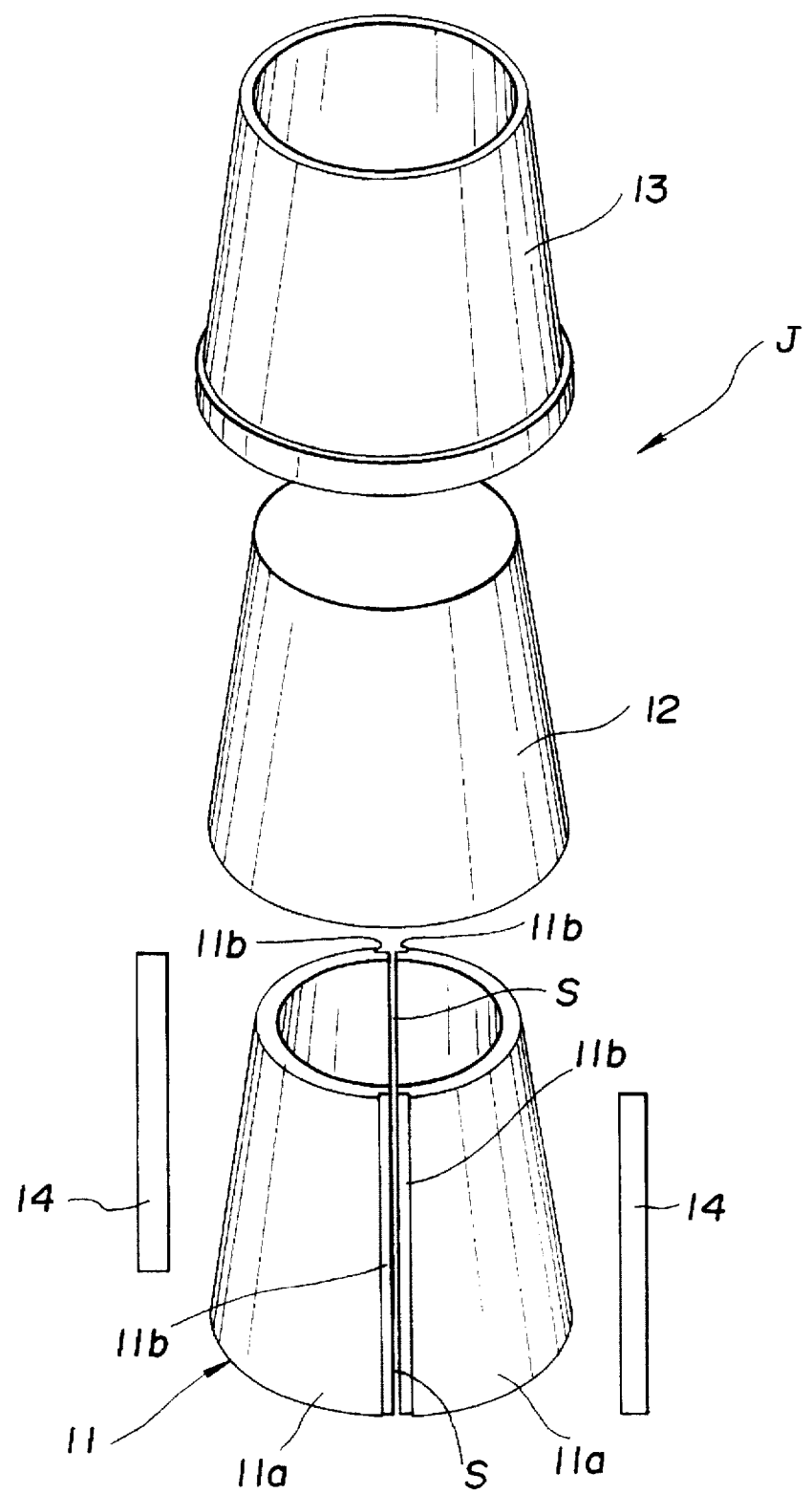
FIG. 3 is an exploded perspective view of the jetavator of FIG. 1A.
Figure 4:
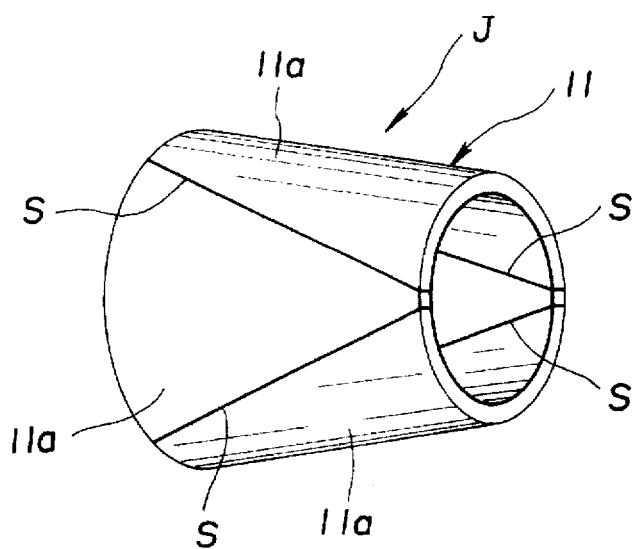
FIG. 4 is a schematic perspective view of an example of a heat-resistant layer forming part of the jetavator according to the present invention, illustrating a second embodiment of the jetavator.

FIG. 4 illustrates the heat-resistant layer 11 of a second embodiment of the jetavator J according to the present invention, which is similar to the first embodiment of FIGS. 1A to 3. The heat-resistant layer 11 is divided into four parts 11a through four slits S. Each slit S is formed passing through the inner peripheral surface to the outer peripheral surface of the heat-resistant layer 11, and formed inclined relative to the vertical plane passing through the center axis X of the jetavator. In this embodiment, each part 11a may be formed with the cutout 11b and provided with the backplate 14 to close the slit S formed between the adjacent parts 11a. The heat-resistant layer 11 may be provided with the heat insulating layer 12 and the reinforcing layer 13 like that of the jetavator J of the first embodiment, though not shown. This embodiment can provide the same advantageous effects as those of the first embodiment. It will be appreciated that the heat-resistant layer 11a of this embodiment may be used singly as the jetavator J without being provided with heat-insulating and reinforcing layers 12, 13.

Figure 5:
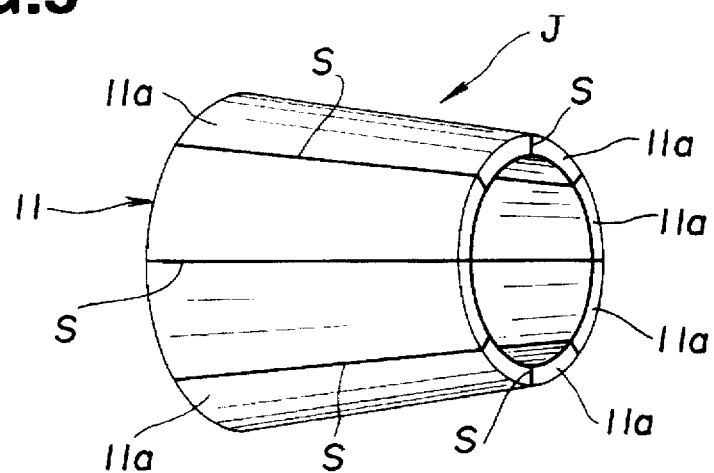
FIG. 5 is a schematic perspective view of another example of a heat-resistant layer forming part of the jetavator according to the present invention, illustrating a third embodiment of the jetavator.

FIG. 5 illustrates the heat-resistant layer 11 of a third embodiment of the jetavator J according to the present invention, which is similar to the first embodiment jetavator J. In this embodiment, the heat-resistant layer 11 is divided into eight parts 11a through eight slits which are formed at equal intervals in the circumferential direction. Each slit S is formed passing through the inner peripheral surface to the outer peripheral surface of the heat-resistant layer 11, and formed such that the plane containing the center axis X of the jetavator passes through the slit S. In this embodiment, each part 11a may be formed with the cutout 11b and provided with the backplate 14 to close the slit S formed between the adjacent parts 11a. The heat-resistant layer 11 may be provided with the heat insulating layer 12 and the reinforcing layer 13 like that of the jetavator J of the first embodiment, though not shown. This embodiment can provide the same advantageous effects as those of the first embodiment. It will be appreciated that the heat-resistant layer 11a of this embodiment may be used singly as the jetavator J without being provided with heat-insulating and reinforcing layers 12, 13.

Figure 6:
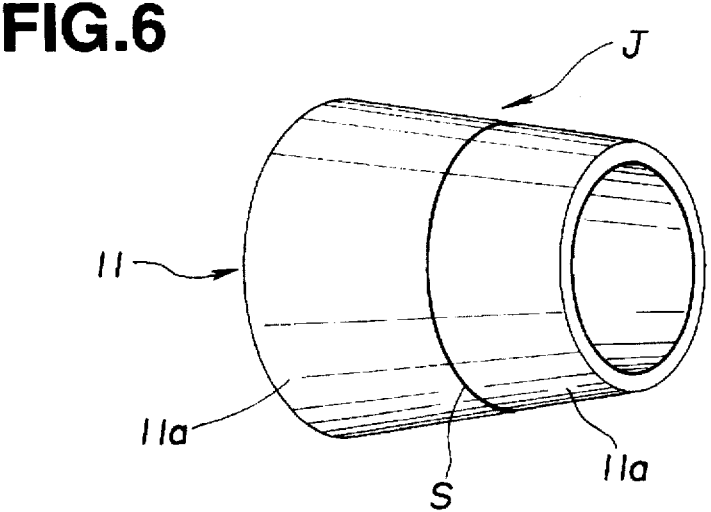
FIG. 6 is a schematic perspective view of a further example of a heat-resistant layer forming part of the jetavator according to the present invention, illustrating a fourth embodiment of the jetavator.

FIG. 6 illustrates the heat-resistant layer 11 of a fourth embodiment of the jetavator J according to the present invention, which is similar to the first embodiment of FIGS. 1A to 3. The heat-resistant layer 11 is divided into two parts 11a through the circumferential slit S. The slit S is formed passing through the inner peripheral surface to the outer peripheral surface of the heat-resistant layer 11, and formed annularly along the periphery of the hollow frustoconical heat-resistant layer 11 in such a manner that a plane (not shown) perpendicular to the center axis X of the heat-resistant layer 11 passes through the slit S. In this embodiment, each part 11a may be formed with the cutout 11b and provided with the backplate 14 to close the slit S formed between the adjacent parts 11a. The heat-resistant layer 11 may be provided with the heat insulating layer 12 and the reinforcing layer 13 like that of the jetavator J of the first embodiment, though not shown. This embodiment can provide the same advantageous effects as those of the first embodiment. It will be appreciated that the heat-resistant layer 11a of this embodiment may be used singly as the jetavator J without being provided with heat-insulating and reinforcing layers 12, 13.

Figure 7:
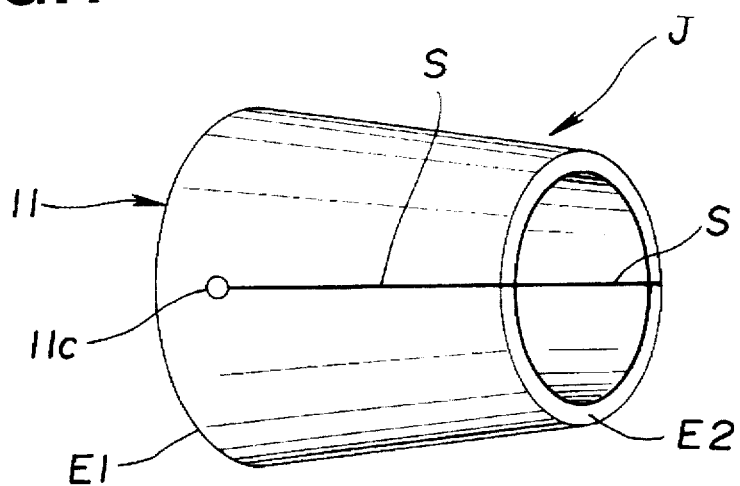
FIG. 7 is a schematic perspective view of a further example of a heat-resistant layer forming part of the jetavator according to the present invention, illustrating a fifth embodiment of the jetavator.

FIG. 7 illustrates the heat-resistant layer 11 of a fourth embodiment of the jetavator J according to the present invention, which is similar to the first embodiment of FIGS. 1A to 3 with the exception that each slit S does not reach the first end E1 of the heat-resistant layer. More specifically, one end of each slit S is separate from the first end E1 so that the heat-resistant layer 11 is formed integral at its section near the first end E1. The end (near the first end E1) of each slit S is connected to or merges in a hole or throughhole 11c for preventing the heat-resistant layer 11 from cracking along the slit S. In this embodiment, the cutouts 11b, 11b may be formed along the slit S and provided with the backplate 14 to close the slit S, though not shown. The heat-resistant layer 11 may be provided with the heat insulating layer 12 and the reinforcing layer 13 like that of the jetavator J of the first embodiment, though not shown. This embodiment can provide the same advantageous effect as that of the first embodiment. It will be appreciated that the heat-resistant layer 11a of this embodiment may be used singly as the jetavator J without being provided with heat-insulating and reinforcing layers 12, 13.

Figure 8:
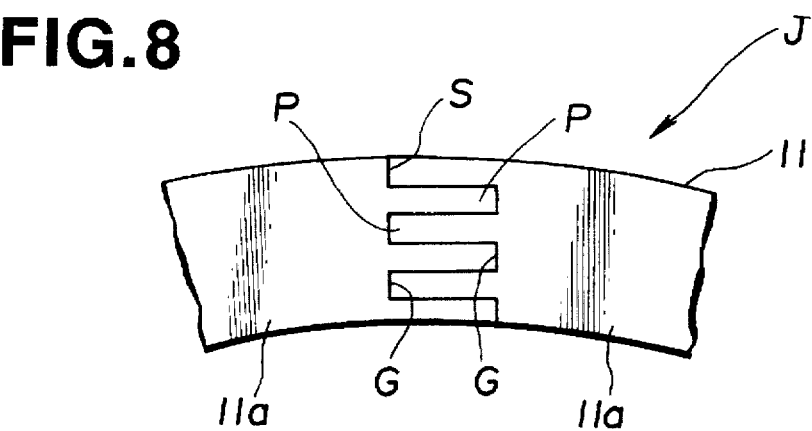
FIG. 8 is a fragmentary enlarged view of an end of a further example of a heat-resistant layer forming part of the jetavator according to the present invention, illustrating a sixth embodiment of the jetavator and showing a particular joining manner for adjacent parts constituting the heat-resistant layer.

FIG. 8 illustrates the heat-resistant layer 11 of a sixth embodiment of the jetavator J according to the present invention, which is similar to the first embodiment of FIGS. 1A to 3. The heat-resistant layer 11 is divided into a plurality of parts 11a through a plurality of slits S. Each slit S is formed passing through the inner peripheral surface to the outer peripheral surface of the heat-resistant layer 11, and formed into a zigzag pattern in cross-section perpendicular to the center axis X of the heat-resistant layer 11 as shown in FIG. 8. Each of such slits S is defined by projections P and grooves G formed at the facing edges of the adjacent parts 11a, 11a, in which facing projection P and groove G engage with each other. Each projection P and groove G extend along the slit S. Thus, according to this embodiment, the cross-sectional shape of the slits S is complicated thereby to further effectively prevent combustion gas from leaking through the slits S. The backplate 14 may be provided to further improving the combustion gas leaking preventing effect. The heat-resistant layer 11 may be provided with the heat insulating layer 12 and the reinforcing layer 13 like that of the jetavator J of the first embodiment, though not shown. This embodiment can provide the same advantageous effect as that of the first embodiment. It will be appreciated that the heat-resistant layer 11a of this embodiment may be used singly as the jetavator J without being provided with heat-insulating and reinforcing layers 12, 13.

What is claimed is:

1. A jetavator for a rocket engine, comprising:

a heat-resistant layer having an annular cross-section, directly contactable with combustion gas, said heat-resistant layer having a slit formed therein passing from an inner peripheral surface to an outer peripheral surface thereof; and a device for preventing the combustion gas from leaking through said slit, wherein said jetavator is arranged to be rotatably installed on a nozzle of the rocket engine so as to deflect a jet of the combustion gas.

2. A jetavator as claimed in claim 1, wherein said slit defining means is arranged to define a plurality of slits formed in said heat-resistant layer to pass from the inner peripheral surface to the outer peripheral surface of said heat-resistant layer, wherein said heat-resistant layer includes a plurality of parts which are formed by being divided through said slits.

3. A jetavator as claimed in claim 2, wherein said parts of said heat-resistant layer are arranged in a circumferential direction of said heat-resistant layer.

4. A jetavator as claimed in claim 2, wherein said parts of said heat-resistant layer are arranged in an axial direction of said heat-resistant layer.

5. A jetavator as claimed in claim 1, further comprising a backplate disposed adjacent said slit and extending along said slit to prevent combustion gas from leaking through said slit, said backplate being disposed to close said slit at a portion opened to the outer peripheral surface of said heat-resistant layer.

6. A jetavator for a rocket engine, comprising:

a heat-resistant layer having an annular cross-section, directly contactable with combustion gas, and means defining a slit formed in said heat-resistant layer to pass from an inner peripheral surface to an outer peripheral surface of said heat-resistant layer, wherein said slit is defined by edges of opposing edge portions of said heat-resistant layer, each edge portion being formed with a groove in the outer peripheral surface at the edge so that grooves of adjacent edge portions form a gutter-like groove, said backplate being disposed in said gutter-like groove.

7. A jetavator as claimed in claim 1, further comprising a heat insulating layer having an annular cross-section and laminated on said heat-resistant layer, and a reinforcing layer having an annular cross-section and laminated on said heat insulating layer.

8. A jetavator for a rocket engine, comprising:

a heat-resistant layer having an annular cross-section, directly contactable with combustion gas, and means defining a slit formed in said heat-resistant layer to pass from an inner peripheral surface to an outer peripheral surface of said heat-resistant layer, wherein said slit is defined by first and second edges which face each other and form part of said heat-resistant layer, said first and second edges having respectively a projection and a groove which are engageable with each other, said projection and said groove extending along said slit.

\* \* \* \* \*